FIP8102 XR 2,981,832

X5264 K

B5

Tx2650

April 25, 1961 R. H. MATTSON 2,981,832

SWITCHING SYSTEM

Filed Oct. 21, 1958

INVENTOR.
Roy. H. Mattson

BY
Ooms, McDougall, Williams & Hersh
Attorneys

United States Patent Office 2,981,832

Patented Apr. 25, 1961

2,981,832

SWITCHING SYSTEM

Roy H. Mattson, Ames, Iowa, assignor to Iowa State College Research Foundation, Inc., Ames, Iowa, a corporation of Iowa Filed Oct. 21, 1958, Ser. No. 768,671

6 Claims. (Cl. 250—13)

Figure 2:
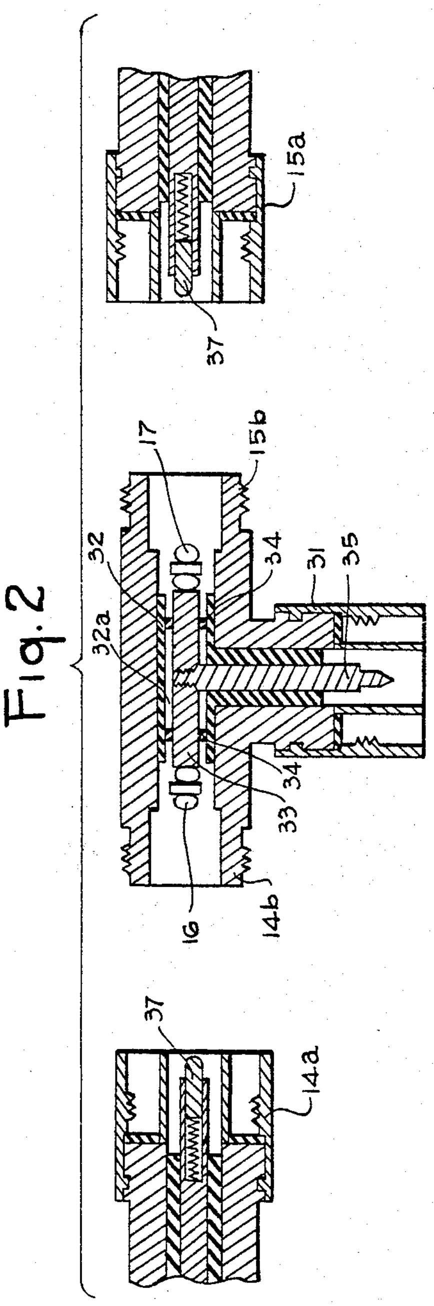

This invention relates to high-speed switching systems, and is particularly directed to apparatus adapted for rapid switching of radio-frequency circuits. A typical application in which my invention is useful consists in switching a single load device, such as the input terminals of a radio receiver, rapidly between a plurality of R.-F. energy sources, such as a pair of receiving antennas. A similar and closely related application for my invention is the rapid switching of an R.-F. generator, such as a radio transmitter, rapidly from one to another of a plurality of load devices, such as transmitting antennas.

Since antennas will function either as transmitting devices or receiving devices, skilled readers will realize that my invention can also be usefully employed to provide switching between a pair of antennas and a single apparatus usable either as a radio receiver or transmitter, commonly called a transceiver.

A particularly important aspect of my invention has to do with radio communication from aircraft. Normally, it is desirable that radio transmission from aircraft be essentially omni-directional. The attitude of an aircraft often changes rapidly in flight, and it is obviously undesirable to have radio communication with the aircraft adversely affected by such attitude changes.

To achieve omni-directional radio transmission from an airplane with a single antenna has proved to be very difficult, particularly at the frequencies in the VHF and UHF range now generally used. An essentially omni-directional radiation path from an airplane can be obtained by using two antennas, properly placed on the aircraft, and attempts have been made heretofore to achieve omni-directional radio communication from an aircraft by suitably placing two antennas on the plane and coupling them simultaneously to the radio apparatus carried aboard. Such attempts have not been wholly satisfactory, however, because, in regions lying within the radiation patterns of both antennas, interference nulls occur which produce undesirable fading and "flutter" on the received or transmited signals.

An important object and achievement of the present invention is to provide a radio system for aircraft wherein a substantially omni-directional radiation pattern for transmission of information is obtained with two antennas without mutual interference between them. As will be hereafter explained, this is achieved in my invention by apparatus which effectively switches the radio equipment on the plane from one antenna to the other at a rate more than double the frequency of the highest significant modulation frequency imposed on the R.-F. carrier. This provides complete transmission of the desired information via each of the antennas, without any possibility of mutual interference.

Another object of the present invention is to provide a switching system for coaxial R.-F. transmission lines wherein all the switching apparatus that carries R.-F. current is mounted within a standard coaxial system comprising only transmission-line elements of standard size. This feature is of tremendous practical importance in using my invention at operating frequencies in the high-VHF and UHF ranges. With that feature, my invention can be used to achieve high-speed circuit switching without introducing any significant discontinuities into the transmission system and without the necessity for elaborate matching networks and the like.

A still further object and advantage of my invention consists in providing a coupling element for a high-speed switching system which can be directly used in conjunction with coaxial R.-F. transmission lines of the type in widespread use.

Other objects and advantages of the invention will be apparent from the following detailed description of certain typical embodiments thereof.

Figure 1:
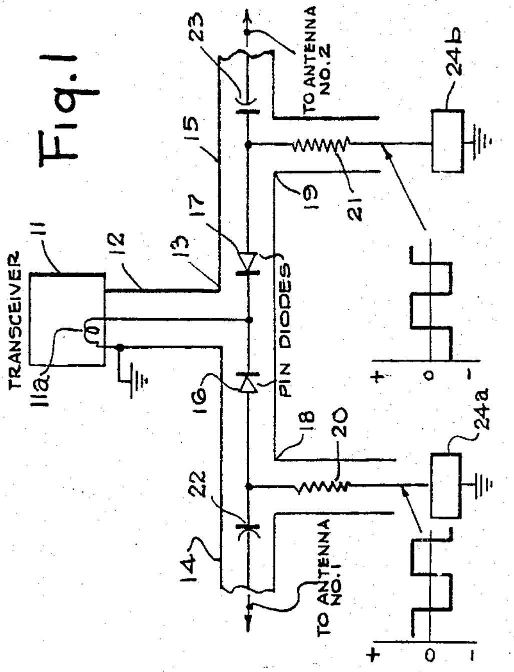
Figure 3:
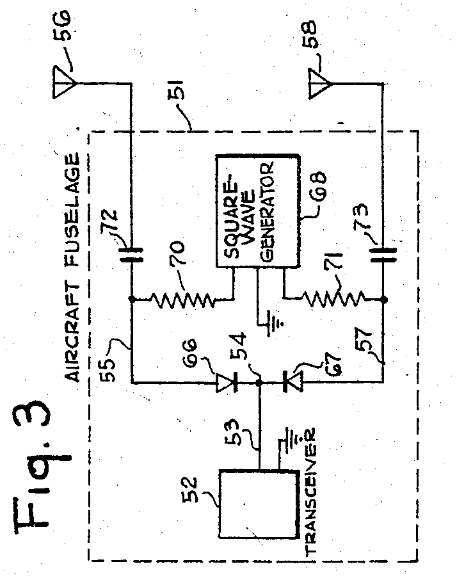

In the appended drawing, Figure 1 is a diagrammatic and schematic view of an R.-F. transmission system embodying the invention, illustrated in a typical embodiment wherein a transceiver is rapidly switched between a pair of antennas. Fig. 2 is a sectional view showing the R.-F. current carrying components of a typical embodiment of my invention, comprising a T-junction coaxial connector adapted for use with my invention and a pair of line-terminal connectors adapted for use with the T-junction connector. Fig. 3 is a schematic diagram showing how my invention can be employed to provide effective omni-directional transmission and reception of radio signals from an aircraft, by means of two antennas, without mutual interference.

In its broadest aspects, my invention achieves switching of R.-F. currents between, for example, a piece of radio apparatus and a pair of antennas by providing a split coaxial path connecting the apparatus with each of the antennas, as by a T-junction, disposing a diode rectifier in each of the branches of the circuit, and alternately biasing the rectifiers to a conductive state by passing therethrough a square-wave current of the fundamental frequency at which switching is desired. I am aware that R.-F. switching by means of biased diodes has been employed heretofore in the radio art, examples of such arrangements being those disclosed in the Dome Patent No. 2,439,651, the Hiehle Patent No. 2,688,699, and the Davis Patent No. 2,815,443. To the best of my knowledge, however, there has been no previous application of this principle in which diode rectifiers were actually inserted in the main coaxial transmission lines used for interchanging energy between a radio apparatus and a pair of antennas. All prior circuits of the sort, so far as I am aware, have employed diodes in conjunction with complicated arrangements involving tuning stubs, inductances, and other reactive elements. Thus these prior-art circuits have been complex, critical of adjustment, and limited in their usefulness to a single R.-F. carrier frequency or a very narrow band of frequencies.

The present invention, as hereinafter described in detail, is simple in the extreme, comprises no elements that are critical in adjustment, and will operate efficiently, without any tuning or readjustment whatever, over a wide band of frequencies. For example, in a typical system assembled by me for use in aircraft radio communication, my invention operated successfully over the entire range from 225 mc./s. to 400 mc./s., which was the frequency band allotted to the particular radio apparatus with which my invention was being used. This does not represent, however, the band-width limits of my invention. Because my invention is inherently free from frequency sensitivity, it can be successfully used throughout the entire HF and VHF range and well into the UHF range, without readjustment.

The invention is shown in its simplest form in Fig. 1 of the drawing. Therein, the block 11 represents a piece of radio apparatus which, in a typical case, might be a transceiver of the type widely used for radio communications on aircraft and other vehicles. The antenna terminals of the transceiver 11 feed into a coaxial transmission line 12 and hence to a T-junction 13. The branches of the T are connected to coaxial transmission lines 14 and 15 which respectively interconnect the transceiver 11 with a pair of antennas (not shown) which are indicated diagrammatically in Fig. 1 as "antenna No. 1" and "antenna No. 2." The outside conductor of the coaxial system is grounded, and a D.-C. path between the center and outer conductors is provided by the R.-F. coupling loop 11*a* which conventionally interconnects the antenna terminals within the transceiver 11.

Connected in series with the center conductors of the respective branch transmission lines 14 and 15, at points quite close to the junction of the T, are a pair of diode rectifiers, respectively marked 16 and 17. These diodes are connected in the circuit "face-to-face"; that is, corresponding terminals of diodes 16 and 17 are connected to the conductor of the coaxial line 12 running to transceiver 11.

At points between the T-junction 13 and the respective antennas Nos. 1 and 2, the coaxial transmission lines 14 and 15 have inserted therein a pair of additional T-junctions 18 and 19. These T-junctions 18 and 19 do not carry any appreciable R.-F. energy off of the lines 14 and 15; to insure that they will not do so, resistors 20 and 21 are placed in series with the inner conductors in the stem portions of both junctions 18 and 19.

To the respective inner conductors of the stem portions of the T-junctions 18 and 19 are applied a pair of square-wave voltages from conventional square-wave generators 24*a* and 24*b*, the square waves being of like frequency but differing in phase by 180°, as indicated on Fig. 1. The outer conductors of the stem portions of T-junctions 18 and 19 may be extended, by means of suitable extension lines, to the square-wave generators, but they perform no function in the operation of the apparatus save a shielding function.

Resistors 20 and 21 may have any desired value, so long as it is sufficiently high to inhibit flow of R.-F. energy down the stem portions of the T-junctions 18 and 19; practically any value of resistance in excess of a few hundred ohms will suffice.

If the antennas used with the system are of the type providing a D.-C. path between their terminals, suitable blocking capacitors 22 and 23 should be connected in series with the inner conductors of transmission lines 14 and 15 at points between the respective antennas and the T-junctions 18 and 19. These capacitors may have any value offering negligible impedance to passage of the R.-F. currents carried to or from the antennas. Preferably they should be of small physical size, in order that they may be mounted within the coaxial transmission lines 14 and 15 without introducing any significant discontinuities therein.

Diodes 16 and 17 are of the semi-conductor type and should be of a size such that their lateral dimension is approximately equal to the diameter of the center conductor employed in the coaxial transmission lines 12, 14, and 15 and T-junction 13, in order that they may introduce no significant discontinuities in the coaxial transmission system. They should be of a type having a very low "forward" impedance, preferably in the neighborhood of 3 ohms to 5 ohms, and a relatively high "back" impedance, preferably of the order of several hundred ohms.

If the application is one in which only a minute amount of R.-F. power is to be carried, such as in a system used exclusively for receiving radio signals, the diodes 16 and 17 may be of the point-contact type or of the conventional PN junction type. If, however, the transmission-line system is required to carry a substantial amount of R.-F. energy, it is preferable that the diodes 16 and 17 be of the type commonly known as PIN silicon type, which are capable of carrying fairly heavy currents. In a typical aircraft-radio installation, the peak transmitted R.-F. power is normally of the order of a few watts—perhaps 10 watts or thereabouts. With coaxial lines having characteristic impedance in the neighborhood of 50 ohms, as is customary, transmission at such power levels involves R.-F. currents in the neighborhood of 500 milliamperes. In such applications, the PIN silicon diodes obtainable commercially from Sarkes-Tarzian, Inc., which have a rating of 600 milliamperes continuous current, are well suited.

When my invention, as diagrammatically illustrated in Fig. 1, is in operation, square-wave voltages at the desired switching frequency, which may be in the neighborhood of 10 kc./s., is applied to the diodes 16 and 17. Since the diodes are connected in opposing relation, and the square waves are 180° out of phase, the diodes are alternately biased in the forward direction and backward direction. The D.-C. current through whichever diode is forwardly biased at any given time returns to the square-wave generator 24*a* or 24*b*, as the case may be, through the internal D.-C. path 11*a* within the transceiver 11. The voltage and current characteristics of the square-wave generator used to supply the switching signal will of course depend on the characteristics of the diodes. The Sarkes-Tarzian PIN diodes above described require a biasing current in the neighborhood of 20 to 30 milliamperes, and, if they are used, square-wave generators should be employed which are capable of driving such a current through the series combination of resistor 20 and diode 16, or resistor 21 and diode 17, as the case may be.

In operation, when the diodes 16 and 17 are being thus biased by the square-wave switching current, the R.-F. circuit is alternately switched from the transceiver 11 to the antenna No. 1 and then to the antenna No. 2, and vice versa. To best explain this operation, let us first consider conditions existing when the transceiver 11 is operating as a transmitter. At any instant when the diode 16 is biased in the forward direction, to render it conductive, its impedance is in the neighborhood of 3 ohms, and the impedance presented to the transceiver 11 by the transmission line 14 is hence about 50 ohms, assuming, as is normally the case, that antenna No. 1 is matched to its transmission line.

At the same instant of time, the diode 17 is biased in the backward direction and hence transmission line 15 presents to the transceiver 11 an impedance of several hundred ohms. This impedance is not purely resistive; it will normally represent a mixture of resistance and capacitive reactance. The exact value of this impedance presented by line 15 is not important, the significant fact being that it is very much higher than that presented by line 14. As a result, practically all of the energy supplied by transceiver 11 is carried down the line 14 and radiated by antenna No. 1, very little of the energy reaching antenna No. 2. At a later time, when the direction of the square-wave current has reversed, the opposite conditions will obtain with respect to diodes 16 and 17, and hence nearly all the R.-F. energy from the transceiver 11 will travel down the line 15 and be radiated by antenna No. 2.

When the transceiver 11 is being used to receive R.-F.

energy from the antennas Nos. 1 and 2, exactly analogous phenomena occur. When diode 16 is conducting, a good impedance match exists between line 14 and the terminals of transceiver 11, while at the same time, because diode 17 is back-biased, a serious mismatch exists between line 15 and the input of transceiver 11. As a result, the transceiver 11 absorbs practically all the energy transmitted to it via line 14 and absorbs almost none of the energy from antenna No. 2 via line 15. At a later instant, when the direction of switching current through the diodes has reversed, a good match with line 15 is provided, while at the same time a serious mismatch exists between the transceiver and line 14. Thus, on receiving, the transceiver 11 alternately receives energy from antenna No. 1 and antenna No. 2, the switching rate being equal to the fundamental frequency of the switching signal.

It should be noted that the peak R.-F. current carried by the diodes may in my invention greatly exceed the magnitude of the switching current through the diodes. When a semi-conductor diode is biased in one direction by a steady biasing current, much larger R.-F. currents can instantaneously flow through the diode in the reverse direction without causing a reversal of the diode bias. This is due to the characteristic behavior of semi-conductor diodes referred to in the literature as "minority carrier storage effect."

In Fig. 2, I have shown in cross section a typical mechanical arrangement by which the electrical structure diagrammatically indicated in Fig. 1 may be realized. The central portion of Fig. 2 shows in axial section a T-junction connector suitable for use as connector 13. It is generally similar to conventional commercially available coaxial T-junction connectors, except for appropriate modifications to incorporate the features of my invention. The stem portion of the T-junction, designated 31 in Fig. 2, may be entirely conventional, being adapted for connection to a conventional coaxial line terminal of the sort widely used in VHF and UHF radio equipment. The particular connector shown in Fig. 2 is adapted for use with the line of connectors having the Army-Navy designation "type N."

The branch legs of the connector, representing the cross bar of the T, are modified to receive the diodes 16 and 17 which form an important part of my invention. If the connector is to be made from a conventional type-N T-junction connector, the original center conductor in the cross-bar portion should be removed and the insulating material 32 therein drilled out to define a central aperture **32*a* of sufficiently large size to accommodate one of the semi-conductor diodes being used. The center conductor 33 is cut off at each end to define a squared end, and the diodes 16 and 17 are soldered thereto, care being taken to avoid heat damage to the diodes. Also, care should be taken to insure that the diodes are connected face-to-face, that is, with corresponding terminals of the diodes soldered to the respective ends of the center conductor 33**.

Before the diodes are soldered to the center conductor 33, the conductor 33 should have slipped over it a pair of insulating spacer washers 34, dimensioned to fit slidably within the central bore **32*a***.

After the diodes and the spacer washers are assembled in position on the conductor 33, it is then inserted in the cross-bar portion of the connector and the center conductor 35 of the stem portion 31 is screwed into place in the aperture provided therefor in center conductor 33. This locks the parts of the connector together.

Plugs adapted for use with my diode-equipped T-junction are shown in Fig. 2 and designated **14*a* and 15*a* respectively. These plugs may be generally of a conventional type, such as the type N heretofore mentioned, except that the original center conductors therein are modified by replacing the conventional pointed terminals thereof with spring-loaded contact elements 37. When the plugs 14*a* and 15*a* are screwed into position on the respective terminals 14*b* and 15*b* of the T-junction connector, the spring-loaded center contact members 37 bear against the free ends of the diodes 16 and 17** and thereby complete the center-conductor circuit through them.

From the foregoing description, it will be understood that my T-junction connector and cooperating plugs, as shown in Fig. 2, provide a two-branched coaxial transmission-line system wherein the switching diodes 16 and 17 form an integral part of the center-conductor circuit and are enabled to perform their switching function without appreciably disturbing the discontinuity of the R.-F. transmission path through the coaxial system.

Illustrating the fact that my diode-equipped connector assembly does not significantly disturb the discontinuity of the R.-F. transmission path of which it forms a part, I have tested a typical connector in an actual assembly of the type shown in Fig. 1 to determine standing-wave ratio and insertion loss, with the following results:

| Frequency in Megacycles | Voltage Standing Wave Ratio | Power Loss, db |
|---|---|---|
| 200 | 1.2 | 1.0 |
| 250 | 1.1 | 1.0 |
| 300 | 1.1 | 1.0 |
| 350 | 1.1 | 1.2 |
| 400 | 1.2 | 1.2 |
| 450 | 1.3 | 1.3 |
| 500 | 1.4 | 1.2 |

During the tests tabulated in the above table, the standing-wave ratio and the insertion loss were measured while transmitting into the T-junction with one didoe forward-biased and the other reverse-biased. The coaxial transmission lines 14 and 15 were both terminated in 50-ohm loads representative of typical antennas. The standing-wave ratios and the insertion loss shown in the tables are in both cases those observed on the branch of the system in which the diode was forward-biased.

It should be noted that the maximum insertion loss over the entire frequency range of 200 mc. to 500 mc. was only 1.3 db, a loss substantially imperceptible under practical conditions. Similarly, the highest standing-wave ratio encountered over the entire frequency range was only 1.4, and, over the greater part of the frequency range, the standing-wave ratio was 1.2 or less. Thus my invention provided, on the conducting side of the system, very good conditions of impedance match throughout a frequency range exceeding two to one.

In Fig. 3, I show schematically a form of my invention which is strikingly successful in achieving omnidirectional radio communication from an aircraft in flight. For simplicity's sake, in Fig. 3, the outer conductors of the various coaxial lines have been omitted, it being understood that such outer conductors are normally maintained at ground potential.

In Fig. 3, an aircraft fuselage is diagrammatically designated by the dotted enclosure 51. Mounted therein at a suitable position is a radio apparatus which is shown in Fig. 3 as a transceiver 52. In practical installations, the transceiver 52 may be replaced by separate transmitting and receiving equipment having a conventional antenna change-over relay. In some cases, where only reception of signals is desired, the transceiver 52 may be replaced by an appropriate radio receiver.

The antenna terminals of transceiver 52 are connected to a coaxial cable schematically indicated by the line 53, which represents the inner conductor thereof. At the T-junction 54, the transmission line splits into two sections, comprising branch 55 running to antenna 56 mounted on the fuselage externally thereof, and branch 57 running to a second antenna 58, also mounted externally of the fuselage. The antennas 56 and 58 should be so positioned on the fuselage as to provide, between them, omni-directional radiation or reception from the aircraft.

Persons skilled in the art will of course understand that the radiation patterns of two such antennas 56 and 58 will normally overlap to a great degree, there being many directions in which good radiation or reception is obtained from both antennas. The extent of such overlap is not important in the embodiment of the invention shown in Fig. 3. Overlap of radiation patterns may occur without any deleterious effects.

Diode 66, corresponding to diode 16 of Fig. 1, is connected in series with the center conductor of transmission-line branch 55, while diode 67, corresponding to diode 17 of Fig. 1, is similarly connected in series with the center conductor of transmission-line branch 57.

A dual square-wave generator 68 has its "hot" output terminals connected through resistors 70 and 71 to the transmission-line branches 55 and 57 respectively.

One of the outputs of generator 68 applies a square-wave voltage to diode 67 via resistor 71 and the ground return path, while the other output of generator 68 applies a square-wave voltage of like frequency, but opposite phase, to the diode 66 via resistor 70 and the ground return path. This biases one of the diodes in the forward direction while biasing the other in the reverse direction, and it alternates the sense of the diode bias each half-cycle, as previously described with respect to Fig. 1. The resistors 70 and 71 correspond to the resistors 20 and 21 of Fig. 1 and may have similar magnitudes of resistance.

Blocking capacitors 72 and 73 are provided in the line branches 55 and 57 respectively, to keep the square-wave voltage from generator 68 off of the antennas 56 and 58.

As has been previously mentioned, the switching frequency at which the antennas 56 and 58 are alternately connected to the transceiver 52 may be in the neighborhood of 10 kc./s. This particular value has been suggested herein simply because it is well adapted for the Fig. 3 application if the transceiver 52 is being used for the purpose of communication by speech. For other types of transmitted intelligence, other switching frequencies may be appropriate, and my invention is not limited to any particular range of switching frequencies.

The reason 10 kc./s. is a desirable value of switching frequency for the Fig. 3 embodiment when communication by speech is desired arises from the fact that the significant frequency components of speech all lie below 4,000 cycles per second. It is well known from modulation theory that if a signal which is a time-magnitude function is sampled instantaneously at regular intervals and at a rate slightly higher than twice the highest significant signal frequency, then the samples contain all of the information of the original signal. Since, in speech communication, the highest significant signal frequencies are in the neighborhood of 4,000 cycles per second, then the sampling rate (switching frequency) needs to be greater than 8,000 cycles per second. I have found that a sampling or switching rate in the neighborhood of 10 kc. works very well, but the frequency is not critical and can be substantially any value greater than 8 kc.

Of course, as a practical matter, the switching frequency should not be set at too high a value, because of the difficulty of generating square waves at high frequencies and because semi-conductor diodes are limited in the maximum frequency at which their bias can be reversed, due to the minority carrier storage effect already mentioned.

When the information to be transmitted involves modulation frequencies substantially different from speech, then of course the switching frequency should be adjusted accordingly, being maintained in all cases at a value at least slightly more than twice the highest significant frequency in the modulation envelope of the radio signals being transmitted or received.

The performance of the Fig. 3 embodiment of my invention in achieving reliable omni-directional radio communication to and from aircraft is remarkable. Since the two antennas are never transmitting at the same time and are never conveying received energy to the receiving apparatus at the same time, phase interference effects productive of fading or fluttering are never encountered. (Of course, my system will not prevent fading or flutter caused by changes in the characteristics of the radio propagation path between the transmitting point and the receiving point, but such effects are almost never serious enough to be significant in the VHF and UHF frequency ranges used for aircraft communications.)

The speech received on a system of the Fig. 3 type is clear and free from any audible evidence of the antenna switching which is taking place. If the positions of the antennas on the aircraft fuselage have been properly chosen, the received or transmitted signal is almost entirely independent of the aircraft attitude, reliable communication being maintained even during periods in which the plane is maneuvering rapidly.

An additional point worthy of comment is this: When my invention is being used for radio communication between two aircraft, wherein antenna switching is being employed on both planes, it is necessary that the switching rates be controlled, since otherwise an audible beat note may be imposed on the modulation envelopes of the received and transmitted signals, due to beats between the respective switching frequencies. This can be prevented merely by holding the switching rates substantially equal, which can easily be done by using crystal oscillators to govern the output frequencies of the square-wave generators.

If the diodes being used in my system are able, without damage, to carry the full diode load current when biased in the reverse direction, a single square-wave generator can be used in place of the dual arrangements shown in the drawing, the square-wave current being passed directly through the series combination of diodes and isolating resistors without any ground return. This arrangement, which will be obvious to skilled readers as an alternative to the arrangement shown, will require a higher power output from the square-wave generator but will not require any D.-C. path through the radio apparatus connected to the coaxial line 12 or 53, as the case may be. Other equivalent circuit configurations for achieving the required diode switching action will also be apparent to skilled readers.

Incidentally, with the arrangement shown, if no D.-C. path to ground is provided within the radio apparatus between the central coaxial conductor and ground, such a path can readily be provided by interposing a conventional R-C coupling circuit between the terminals of the radio apparatus 11 or 52 and the input of the coaxial line 12 or 53. This will likewise be obvious to readers skilled in the art.

Skilled readers will also realize that the principles of this invention can readily be used in multi-branched arrangements in which an assembly of apparatus is switched among three or more alternative branch circuits, rather than only two, as herein described.

The various embodiments of my invention which have been illustrated and described in this specification are merely exemplary. Persons skilled in the art will be able to make many variations in the illustrated structures without departing from the spirit of my invention. It is accordingly my desire that the scope of the invention be determined primarily with reference to the appended claims.

I claim:

1. A radio-frequency transmission system comprising a coaxial transmission line having an outer conductor and an inner conductor and containing a T-junction comprising a coaxial stem portion having inner and outer conductors respectively connected to like conductors of said line, two semi-conductor diodes, each having two terminals of opposite polarity, said diodes being insulatedly mounted within the outer conductor of said line and connected in series with the inner conductor thereof, said diodes being disposed on opposite sides of said T-junction, and means connected to the inner conductor of said line on opposite sides of said diodes operative to pass through said diodes intermittently reversing current effective to bias said diodes oppositely, the direction of said bias on both diodes reversing at a predetermined frequency much lower than said radio frequency, whereby a radio-frequency transmission path is defined from the stem portion of said T-junction to one end of said line when one of said diodes is forwardly biased and from the stem portion of said T-junction to the other end of said line when the other of said diodes is forwardly biased.

2. A radio-frequency transmission system comprising a coaxial transmission line having an outer conductor and an inner conductor and containing a T-junction comprising a coaxial stem portion having inner and outer conductors respectively connected to like conductors of said line, radio-frequency energy-receiving means connected to said stem portion, a pair of radio-frequency energy sources connected respectively to the opposite ends of said line, two semi-conductor diodes, each having two terminals of opposite polarity, said diodes being insulatedly mounted within the outer conductor of said line and connected in series with the inner conductor thereof, said diodes being disposed on opposite sides of said T-junction and having terminals connected together via said inner conductor of said line, and means connected to the inner conductor of said line on opposite sides of said diodes operative to pass through said diodes intermittently reversing current effective to bias said diodes oppositely, the direction of said bias on both diodes reversing at a predetermined frequency much lower than said radio frequency, a radio-frequency transmission path from one of said energy sources to said receiving means being defined when one of said diodes is forwardly biased and a similar path from the other of said energy sources to said receiving means being defined when the other of said diodes is forwardly biased.

3. A radio-frequency transmission system comprising a coaxial transmission line having an outer conductor and an inner conductor and containing a T-junction comprising a coaxial stem portion having inner and outer conductors respectively connected to like conductors of said line, a radio-frequency energy source connected to said stem portion, a pair of radio-frequency load devices, said devices being respectively connected to the opposite ends of said transmission line, two semi-conductor diodes, each having two terminals of opposite polarity, said diodes being insulatedly mounted within the outer conductor of said line and connected in series with the inner conductor thereof, said diodes being disposed on opposite sides of said T-junction and having terminals connected together via said inner conductor of said line, and means connected to the inner conductor of said line on opposite sides of said diodes operative to pass through said diodes intermittently reversing current effective to bias said diodes oppositely, the direction of said bias on both diodes reversing at a predetermined frequency much lower than said radio frequency, a radio-frequency transmission path from said energy source to one of said load devices being defined when one of said diodes is forwardly biased and a similar path from said energy source to the other of said load devices being defined when the other of said diodes is forwardly biased.

4. A radio-frequency transmission system comprising a coaxial transmission line having an outer conductor and an inner conductor and containing a T-junction comprising a coaxial stem portion having inner and outer conductors respectively connected to like conductors of said line, radio apparatus connected to said stem portion operable at an operator's will to transmit or receive radio-frequency energy, a pair of space-coupled antennas, said antennas being respectively coupled to the opposite ends of said line, two semi-conductor diodes, each having two terminals of opposite polarity, said diodes being insulatedly mounted within the outer conductor of said line and connected in series with the inner conductor thereof, said diodes being disposed on opposite sides of said T-junction and having terminals connected together via said inner conductor of said line, and means connected to the inner conductor of said line on opposite sides of said diodes operative to pass through said diodes intermittently reversing current effective to bias said diodes oppositely, the direction of said bias on both diodes reversing at a predetermined frequency much lower than said radio frequency, a radio-frequency transmission path being defined between said radio apparatus and one of said antennas when one of said diodes is forwardly biased and a similar path being defined between said radio apparatus and the other of said antennas when the other of said diodes is forwardly biased.

5. A radio-frequency transmission system comprising a coaxial transmission line having an outer conductor an inner conductor and containing a first T-junction comprising a coaxial stem portion having inner and outer conductors respectively connected to like conductors of said line, radio apparatus connected to the stem portion of said first T-junction, a pair of space-coupled antennas, said antennas being respectively connected to the opposite ends of said line, two semi-conductor diodes, each having two terminals of opposite polarity, said diodes being insulatedly mounted within the outer conductor of said line and connected in series with the inner conductor thereof, said diodes being disposed on opposite sides of said first T-junction and having terminals connected together via said inner conductor of said line, a second T-junction disposed in said line between said diodes and one of said antennas, said second T-junction comprising a coaxial stem portion having inner and outer conductors respectively connected to like conductors of said line, a third T-junction disposed in said line between said diodes and the other of said antennas, said third T-junction comprising a coaxial stem portion having inner and outer conductors respectively connected to like conductors of said line, square-wave generator means operative to develop intermittently reversing voltage, and two isolating resistors, one of said resistors being connected in series with the inner conductor of the stem portion of said second T-junction and the other of said resistors being connected in series with the inner conductor of the stem portion of said third T-junction, said inner conductors of said stem portions of said second and third T-junctions being connected to and fed by said square-wave-generator means, said generator means being operative to pass through said diodes intermittently reversing current effective to bias said diodes oppositely, the direction of said bias on both diodes reversing at a predetermined frequency much lower than said radio frequency, whereby a radio-frequency transmission path is defined from said radio apparatus to one of said antennas when one of said diodes is forwardly biased and from said radio apparatus to the other of said antennas when the other of said diodes is forwardly biased.

6. Aircraft radio communication apparatus comprising an aircraft fuselage, a pair of antennas mounted thereon and positioned to have overlapping radiation patterns collectively defining a substantially omni-directional radiation pattern, radio apparatus mounted within said fuselage, and a radio-frequency transmission system interconnecting said radio apparatus and said antennas, said system comprising a coaxial line having an outer conductor and an inner conductor and having its opposite ends connected to said antennas and containing a T-junction comprising a coaxial stem portion having inner and outer conductors respectively connected to like conductors of said line, said coaxial stem portion being connected to said radio apparatus within said fuselage, two semi-conductor diodes, each having terminals of opposite polarity, said diodes being insulatedly mounted within the outer conductor of said line and connected in series with the inner conductor thereof, said diodes being disposed on opposite sides of said T-junction and having terminals connected together via said inner conductor of said line, and switching-voltage generator means connected to the inner conductor of said line on opposite sides of said diodes operative to pass through said diodes intermittently reversing current effective to bias said diodes oppositely, the direction of said bias on both diodes reversing at a predetermined frequency much lower than said radio frequency, whereby a radio-frequency transmission path is defined from said radio apparatus to one of said antennas when one of said diodes is forwardly biased and from said radio apparatus to the other of said antennas when the other of said diodes is forwardly biased.

References Cited in the file of this patent

UNITED STATES PATENTS

| | | |
|---|---|---|
| 2,403,500 | Carlson | July 9, 1946 |
| 2,439,651 | Dome | Apr. 13, 1948 |
| 2,497,958 | Peterson | Feb. 21, 1950 |
| 2,552,052 | Matare | May 8, 1951 |
| 2,618,753 | Mierlo | Nov. 18, 1952 |
| 2,618,777 | Ashmead | Nov. 18, 1952 |
| 2,657,318 | Rack | Oct. 27, 1953 |
| 2,688,699 | Hiehle | Sept. 7, 1954 |
| 2,782,303 | Goldberg | Feb. 19, 1957 |